United States Patent
Zhu et al.

(10) Patent No.: US 9,857,674 B2
(45) Date of Patent: Jan. 2, 2018

(54) SPONTANEOUS POP-UP DISPLAY DEVICE

(71) Applicant: Arovia, Inc., Houston, TX (US)

(72) Inventors: Shengliang Zhu, Houston, TX (US); Alexander David Wesley, Houston, TX (US)

(73) Assignee: Arovia, Inc., Houston, TX (US)

( * ) Notice: Subject to any disclaimer, the term of this patent is extended or adjusted under 35 U.S.C. 154(b) by 0 days.

(21) Appl. No.: 15/507,165

(22) PCT Filed: Mar. 24, 2016

(86) PCT No.: PCT/US2016/024094
§ 371 (c)(1),
(2) Date: Feb. 27, 2017

(87) PCT Pub. No.: WO2016/154481
PCT Pub. Date: Sep. 29, 2016

(65) Prior Publication Data
US 2017/0351168 A1    Dec. 7, 2017

Related U.S. Application Data

(60) Provisional application No. 62/244,298, filed on Oct. 21, 2015, provisional application No. 62/168,844, filed on May 31, 2015, provisional application No. 62/138,390, filed on Mar. 26, 2015.

(51) Int. Cl.
*G03B 21/10* (2006.01)
*G03B 21/58* (2014.01)
*G03B 21/14* (2006.01)

(52) U.S. Cl.
CPC ............. *G03B 21/58* (2013.01); *G03B 21/10* (2013.01); *G03B 21/145* (2013.01)

(58) Field of Classification Search
CPC ........ G03B 21/10; G03B 21/11; G03B 21/14; G03B 21/145; G03B 21/56; G03B 21/58; G03B 21/62; G03B 21/64
See application file for complete search history.

(56) References Cited

U.S. PATENT DOCUMENTS

| | | |
|---|---|---|
| 3,144,889 A | 8/1964 | La Mar |
| 3,560,088 A | 2/1971 | Schwartz |
| 4,323,301 A | 4/1982 | Spector |
| 4,432,619 A | 2/1984 | Schmidt |
| 5,510,862 A | 4/1996 | Lieberman |

(Continued)

FOREIGN PATENT DOCUMENTS

| | | |
|---|---|---|
| DE | 20302079 U1 | 7/2003 |
| DE | 10305497 A1 | 8/2004 |

(Continued)

*Primary Examiner* — William C Dowling
(74) *Attorney, Agent, or Firm* — Cecil Alan McClure

(57) ABSTRACT

The present invention provides an improved collapsible display device. The improved collapsible display device has a housing member having a moveable member on the exterior of said housing and said moveable member is moveable between two positions, a collapsible screen capable of displaying an image when in an extended position, and multiple extendible members connected to said screen and rotatably connected to both said moveable member and said housing, and said moveable member moves said screen between the collapsed and extended operating positions as said moveable member moves between a first position and a second position.

20 Claims, 18 Drawing Sheets

(56) References Cited

U.S. PATENT DOCUMENTS

| | | |
|---|---|---|
| 5,838,493 A | 11/1998 | Furuya |
| 6,034,717 A | 3/2000 | Dentinger |
| 6,191,886 B1 | 2/2001 | Sinkoff |
| 6,466,369 B1 | 10/2002 | Maddock |
| 6,637,896 B2 | 10/2003 | Li et al. |
| 6,873,460 B1 | 3/2005 | Burstyn et al. |
| 8,313,199 B2 | 11/2012 | Hirata |
| 2004/0057109 A1 | 3/2004 | Edney |
| 2005/0174638 A1 | 8/2005 | Kotera |
| 2006/0077356 A1 | 4/2006 | Merczak |
| 2006/0232610 A1 | 10/2006 | Lee et al. |
| 2006/0234784 A1 | 10/2006 | Reinhorn |
| 2007/0171375 A1 | 7/2007 | Mizuuchi et al. |
| 2009/0190212 A1 | 7/2009 | Wang |
| 2010/0007950 A1 | 1/2010 | Yuzawa |
| 2010/0045569 A1 | 2/2010 | Estevez |
| 2011/0132557 A1 | 6/2011 | Korai |
| 2011/0242501 A1 | 10/2011 | Kepley |
| 2013/0128238 A1 | 5/2013 | Estevez et al. |

FOREIGN PATENT DOCUMENTS

| | | |
|---|---|---|
| JP | 2007264282 A | 10/2007 |
| JP | 2003101909 A | 11/2007 |
| JP | 2008065018 A | 1/2009 |
| JP | 2000010196 A | 9/2009 |
| JP | 2011095303 A | 5/2011 |
| JP | 2012118548 | 6/2012 |
| JP | 2013142852 A | 7/2013 |
| NL | 1033809 C2 | 11/2008 |

SPONTANEOUS POP-UP DISPLAY DEVICE

This application claims priority under 35 USC 119(a)(1) of Provisional Applications: 62/138,390, filed on Mar. 26, 2015: 62/168,844, filed on May 31, 2015; and 62/244,298, filed on Oct. 21, 2015.

TECHNICAL FIELD OF THE INVENTION

This invention relates to collapsible display devices.

BACKGROUND OF THE INVENTION

Displays have been used in multiple sizes and configurations in conference rooms, homes, hotels, offices, and other locations for showing information. Such displays may be portable or built into a room, like a conference room. In addition, projection televisions and other projectors are used for larger audiences. There are also small projector systems that are available for displaying information.

An object of the present invention is to provide an improved, collapsible display device.

SUMMARY OF THE INVENTION

The present invention is a collapsible display device, where the device can be stored in a compact form and pop-up to provide a screen when in use. The Spontaneous Pop-Up Display (SPUD) invention has multiple embodiments. The prototypes disclosed herein are actual embodiments of a spontaneous pop-up display.

These and other features of the invention will become apparent to those skilled in the art from the following detailed description of the invention, taken together with the accompanying drawings.

DETAILED DESCRIPTION

Figure 1:
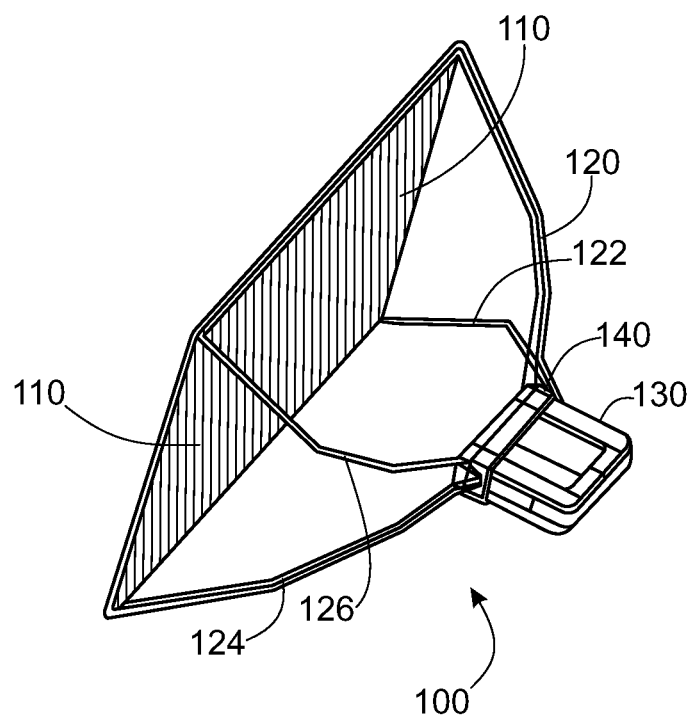
FIG. 1 depicts the general arrangement of one embodiment of the collapsible display of the present invention.

The present invention is a Spontaneous Pop-Up Display (SPUD) device. The SPUD is a collapsible display device, where the device can be stored in a compact form and then pop-up to provide a screen when in use. FIG. 1 depicts one embodiment 100 of the present invention.

Referring now to FIG. 1, there may be seen one embodiment 100 of the collapsible display of the present invention in a fully extended operating position. More particularly, it may be seen that this embodiment 100 has a fully extended display screen 110 and four collapsible arms 120, 122, 124, 126 attached at the corners of the screen and that each of the arms are also attached to a corresponding location on a main body portion 130. The arms have two attachment points on the body. One attachment of each arm is to a fixed non-moving portion of the body 130. A second attachment of each arm is to a moveable sliding member 140 disposed on or around the main body or housing that is described in more detail later herein. Note that each arm has two joints that allow for collapsing the arms and the screen as described in more detail later herein.

Figure 2:
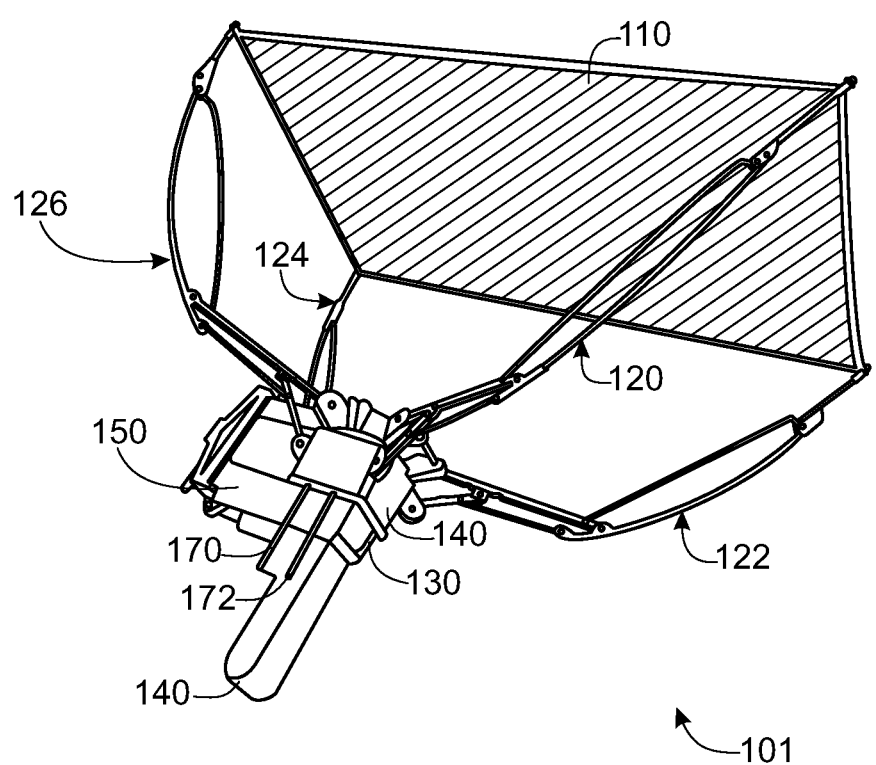
FIG. 2 depicts a prototype of one embodiment of the collapsible display of the present invention in the fully extended operating position.

Referring now to FIG. 2, there may be seen a prototype 101 of the collapsible display of the present invention in its fully extended operating position. More particularly, it may be seen that this embodiment has a fully extended display screen 110 with four collapsible arms 120, 122, 124, 126 attached to the screen and that each of the arms are also attached to a corresponding location on a main body portion 130, 140. The attachment of the arms to the body and the details of the arms are described in more detail later herein.

The main housing 130 is configured to be able to contain a projector or other non-deployed display screen, to provide support for the collapsible folding arms, and to allow the sliding u-shaped block member 140 on the exterior of the housing to slide smoothly on the rails 170, 172. Rails 170, 172 keep the sliding block member 140 disposed on and around the main housing 130. The housing 130 may also include a handle 160 at the very back of the device. The handle allows an individual to hold the device by the handle 160 while pushing the sliding block member 140 forward to pop up the screen 110 for display. There is also depicted a portion 150 to the side of the main body 130 for containing electronics components if needed. Such components may include, but are not limited to, a battery and circuitry for controlling any projector. The body 130 has a main axis that runs down the center of the body. In this embodiment the screen 110 is flat, positioned vertically in front of the body 130 and positioned perpendicular to the main axis of the body.

The screen 110 may also have a foldable Frisbee frame that may be attached, but removable, around its outer edge (not depicted). The frame supports and provides tension to the screen to create a smooth surface. The frame can also easily collapse into the size of a small circle to reduce storage space. For rear projection, the material of the screen is preferably vinyl or silicon based translucent materials. For forward projection, the material of the screen may be a more opaque material. These projection screen materials diffuse the light coming from a projector, preferably resist wrinkles when stored folded up, and are stretchable to a tensioned state. The screen is preferably dust-resistant, removable and easily cleaned with soap, and durable. One example of the screen would be one available from Da-lite, like the Da-lite Ultra Wide Angle screen. For front projection, the material of the screen is preferably no longer translucent but relatively non-translucent, and still possess the other features of the rear projection screen material. Other examples of screens that may employ, include, but are not limited to OLED, LCD and LED type screens. In addition, for some embodiments, ribs may be inserted into the screen for stiffening it and made of materials that do not interfere with the viewing of any images projected on the screen.

The screen 110 is preferably tensioned using the extended folding arms 120, 122, 124, 126 supporting the screen rather than a frame around the screen. They extend out and stay tensioned when the ends of the arms connected to the housing 130 and the moveable member 140, respectively connected to the fixed part of the housing 130 and connected to the moveable member 140 disposed on or around the housing, are pushed towards each other by moving the sliding, or moveable member 140 forward on the housing 130. The other end of the folding arms 120, 122, 124, 126 is connected to the corners of a rectangular screen 110 and provide the outward force to tension the screen to mitigate wrinkles. Depending on how much tension is desired in the screen, additional folding arms can be added to connect to points on the edges of the screen to further tension the screen 110 and to provide arm redundancy for an arm failure. Although the screen 110 is depicted as rectangular in shape, the screen may be formed in any shape and may even be curved for some embodiments.

In order to push the two ends of the folding arms 120, 122, 124, 126 toward each other, a sliding block member 140 is disposed on or around the exterior of the housing 130. The first end of each folding arm is connected to the housing 130 via a rotatable axis that is fixed. The second end of each folding arm is connected on a rotatable axis on the sliding member 140. When the device 101 is initially in a closed up position, the sliding member 140 is located at the back of the device main housing 130 near the handle 160. To pop-up the folding arms, the sliding member 140 is pushed forward. The sliding member 140 self-latches itself (not sliding back) automatically once it reaches the stops on the front end of the rails 170, 172. The reason that the sliding member self-latches is that the screen end of the folding arms follow a path that traces an arch when opening up, and in the final fully extended position of the screen, the screen end of the arms is at a lower point in the arc than when opening and after passing though the maximum of the arc. This is described in more detail hereinafter when discussing FIG. 15 and FIG. 16. Some embodiments may be self-latching, but others may rely on springs or mechanical latching mechanisms.

The housing 130 may be configured to include a projector with or without a wide angle converter lens, or another form of collapsible display, in addition to mounting the multiple folding arms, and the exterior sliding block member.

For embodiments that use a projector that is not capable of having a short screen to projector display distance, a separate wide angle converter lens is preferably added to the front of such a projector when employed with this device. The lens is fixed to the projector which is fixed to the housing. The lens can shorten the throw ratio of the projector so that, in order to achieve the same screen size, the screen can now be placed closer to the housing (containing the projector) than without a wide angle lens to save table space. The projector in the device 101 can either be tilted, or have an offset of the light beam to prevent the projected light beam from being partially cut off by a table top. For an embodiment where an offset exists, the lens can tilt such that the axis of the lens is angled with regard to the axis of the projector.

Again, for some embodiments, the housing 130 may hold any type of available, small, light-weight projector and its associated lens, provide support for the folding arms 120, 122, 124, 126, and allows the sliding block member 140 to slide smoothly on the rails 170, 172. The housing 130 also includes a handle 160 at the very back of the device. The handle facilitates an individual to hold the device 101 while pushing the sliding block member 140 forward to pop-up the screen.

The prototype of FIG. 2 may employ any projector that directly projects forward and the prototype does not use or have any external mirrors, but other embodiments may use mirrors, as described later herein. Mirrors may be employed to shorten the depth of the device when fully extended, or alternatively to lengthen the optical path from the projector to the screen or reposition the image from the projector to the side of the main body or above the main body. Further, the moveable member may be spring loaded to move into the extended position upon pushing a release button (not depicted) on the handle or on the main housing body. In addition, the prototype of FIG. 2 may employ a camera (not depicted) for viewing the screen and the position of a finger or pointer on that screen for determining the location of that pointer on the image, then transmitting that location to a controller to allow for a touch screen embodiment. Other touch screen embodiments may be constructed using capacitive touch materials, or other materials, in or for the screen.

Figure 3:
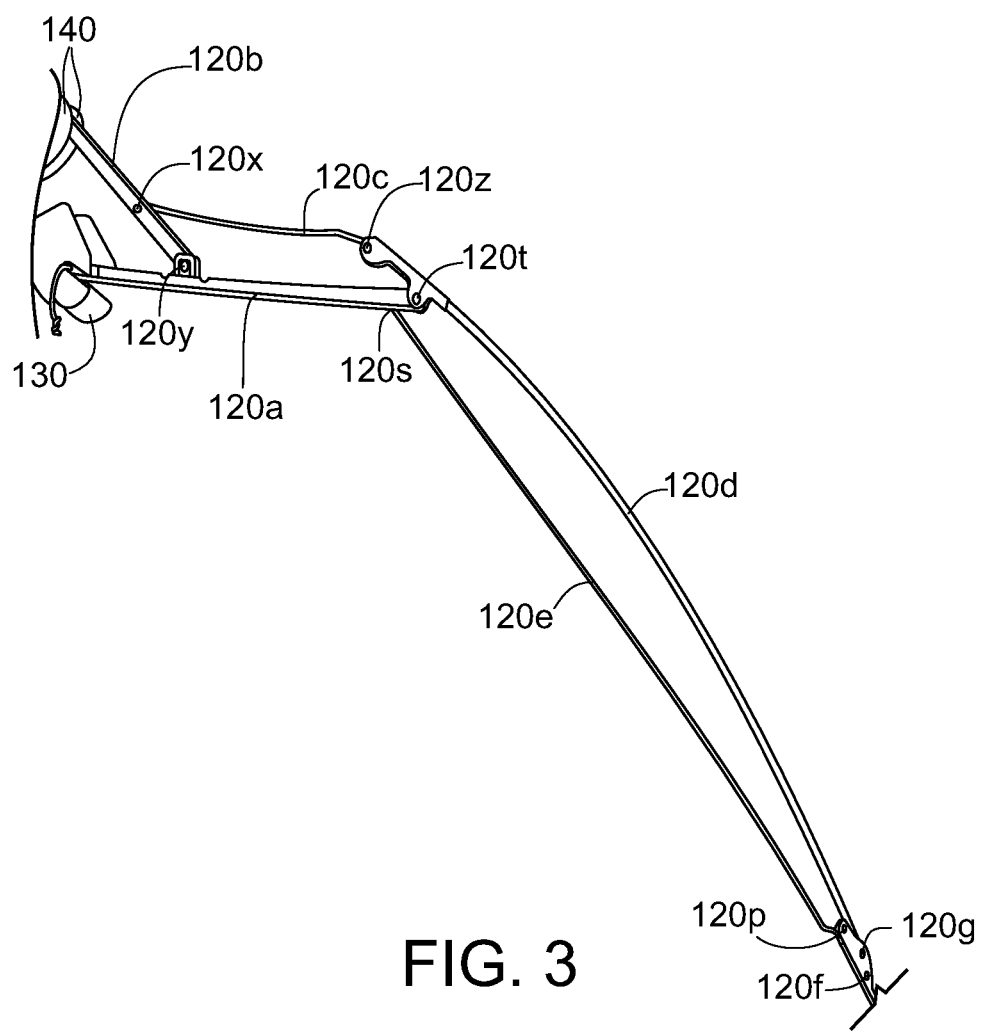
FIG. 3 depicts one folding arm of the prototype of FIG. 2 in its fully extended operating position.

Referring now to FIG. 3, there may be seen an expanded view of one folding arm 120, 122, 124, or 126 of the prototype of FIG. 2 in a fully extended operating position. As depicted in FIG. 3, again, each arm has two attachment points on the main body. The first attachment of each arm is a long first strut 120a rotatably attached to a fixed non-moving portion of the main body 130. The second rotatable attachment of each arm is a shorter second strut 120b that is rotatably connected to the first strut 120a approximately half way up the first strut 120a and is also rotatably connected to a moveable member 140 on the body. A rotatable connection is separately labeled, for example the rotatable connection between first strut 102a and second strut 102b is 102y. Note also that the shorter second strut 120b has a third strut 120c rotatably connected to it and also to a fourth strut 120d that is rotatably connected to the first strut 120a at nearly one end and rotatably connected to the third strut 120c at that same end. Continuing to refer to FIG. 3 it may be seen that each arm also has a fifth strut 120e rotatably connected to the first strut 120a approximately adjacent the rotatable connection 120z of the third and fourth struts and is also rotatably connected at the opposite end of the fifth strut. The fourth strut 120d is separately rotatably connected 120q to a sixth strut 120f at the end not connected to the third strut. The sixth strut 120f in turn is connected at the other end to the screen 110 (not depicted) on one corner of the screen. For some embodiments of the present invention, each of these arms is preferably an actual umbrella arm like the ones in commercially available umbrellas from Paradise Umbrella (located in China) that have been modified in accordance with the teachings of the present invention, and as discussed more fully later herein with regard to FIG. 15.

Figure 4:
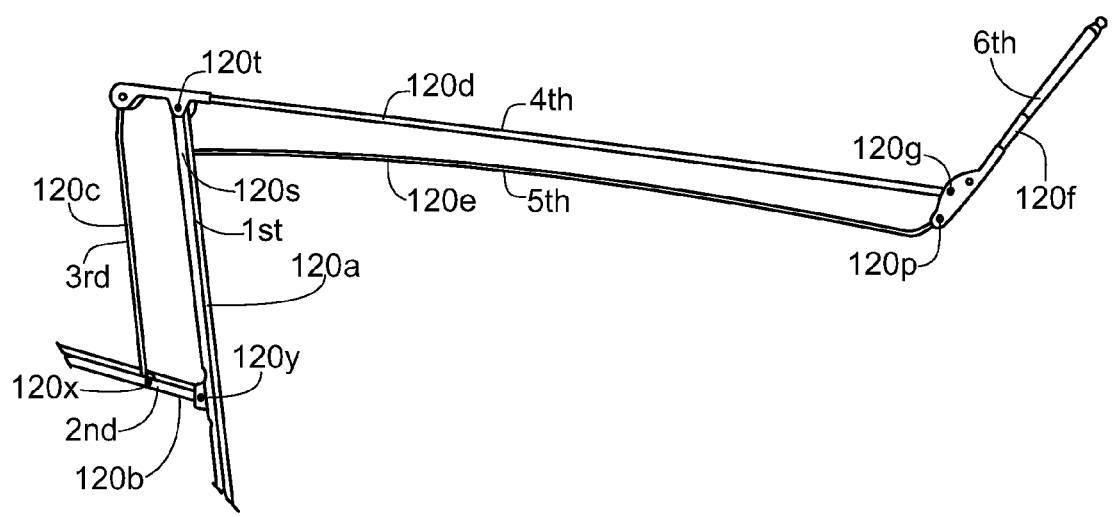
FIG. 4 depicts the folding arm of FIG. 3 in a partially extended operating position.

Referring now to FIG. 4, there may be seen an expanded view of one folding arm of the prototype of FIG. 2 in its partially extended operating position. Again as depicted in FIG. 3, each arm has two attachment points on the main body. The first attachment of each arm is a long first strut 120a and the second attachment is a shorter second strut 120b rotatably connected to a moveable sliding member of the body 140. The shorter second strut 120b has a third strut 120c rotatably connected to it. A fourth strut 120d is rotatably connected to the first strut 120a at nearly one end and rotatably connected to the third strut 120c at that same end. Continuing to refer to FIG. 4 it may be seen that each arm also has a fifth strut 120e rotatably connected to the first strut 120a and rotatably connected at the opposite end of the fifth strut 120e. The fourth strut 120d is connected to a sixth strut 120f and the sixth strut 120f is connected to the screen 110 (partially depicted). Note that fifth strut 120f is no longer a nearly straight extension of fourth strut 120d, but is rotating back to a folded or collapsed position.

Figure 5:
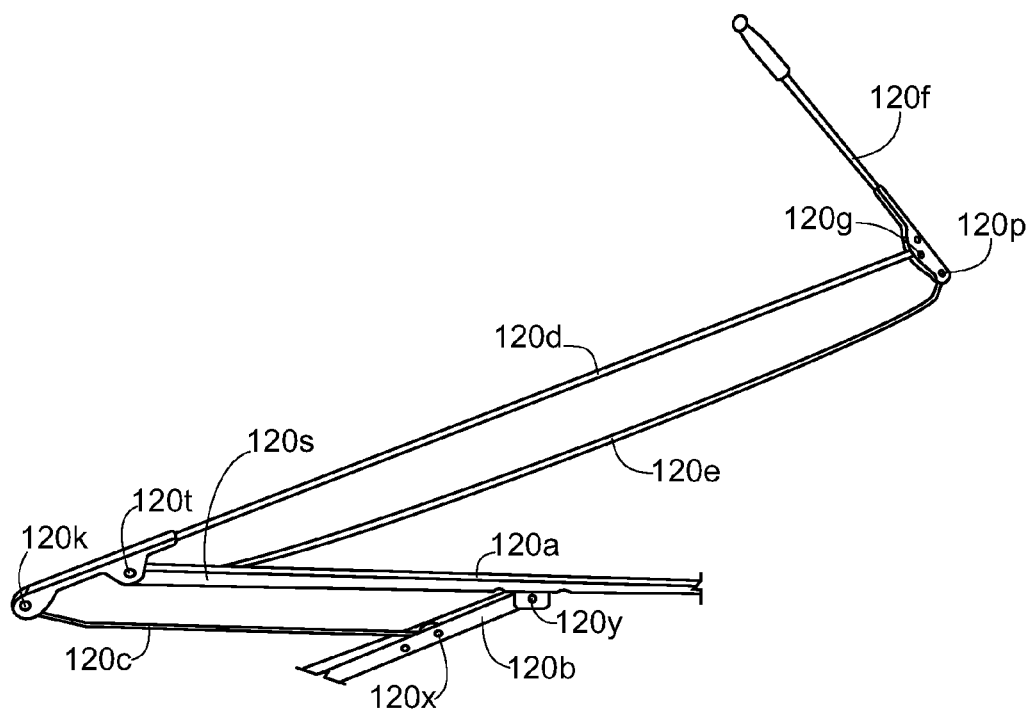
FIG. 5 depicts the folding arm of FIG. 3 in a partially collapsed operating position.

Referring now to FIG. 5, there may be seen an expanded view of one folding arm of the prototype of FIG. 2 in its partially extended operating position. Again as depicted in FIG. 3, each arm has two attachment points on the main body. The first attachment of each arm is a long first strut 120a and the second attachment is a shorter second strut 120b rotatably connected to a moveable sliding member of the body 140. The shorter second strut 120b has a third strut 120c rotatably connected to it. A fourth strut 120d is rotatably connected to the first strut 120a at nearly one end and rotatably connected to the third strut 120c at that same end. Continuing to refer to FIG. 4 it may be seen that each arm also has a fifth strut 120e rotatably connected to the first strut 120a and rotatably connected at the opposite end of the fifth strut 120e. The fourth strut 120d is connected to a sixth strut 120f and the sixth strut is connected to the screen 110 (partially depicted). Note that fifth strut 120f is no longer a nearly straight extension of fourth strut 120d, but is rotating back to a more folded or collapsed position.

Figure 6:
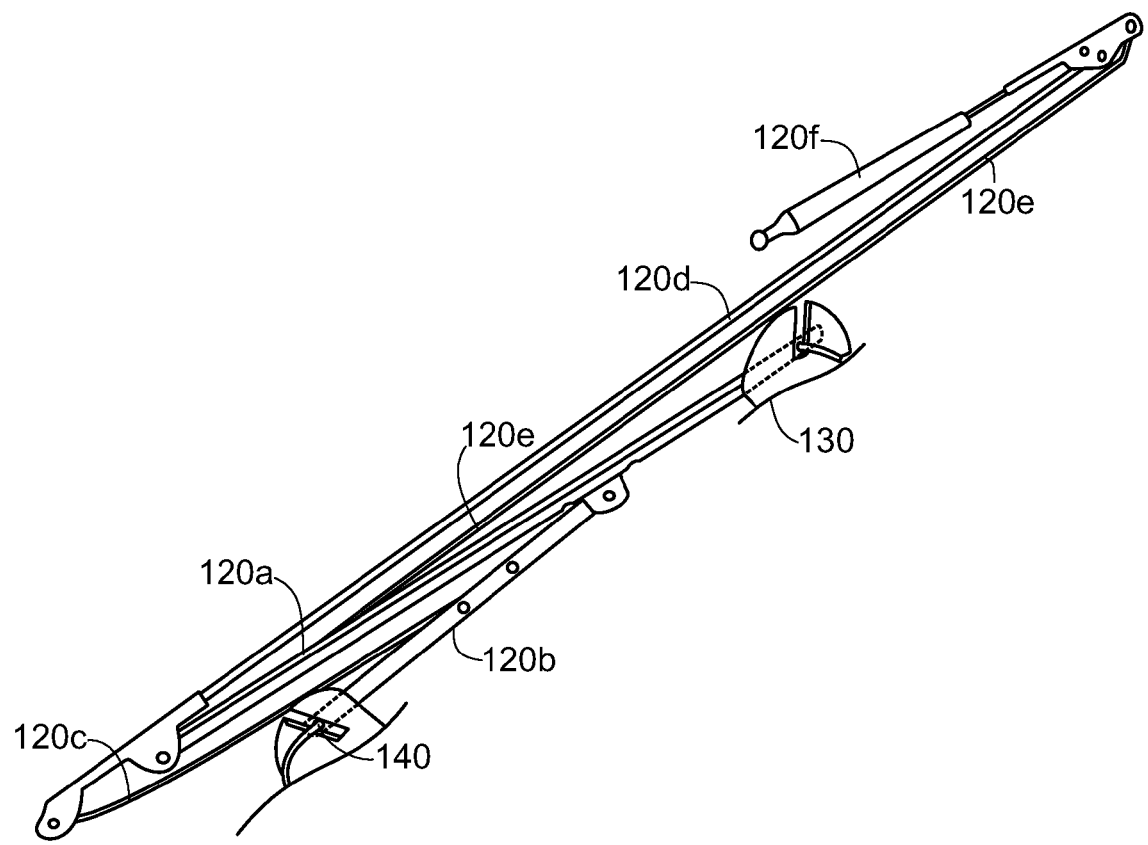
FIG. 6 depicts the folding arm of FIG. 3 in its fully collapsed operating position.

Referring now to FIG. 6, there may be seen an expanded view of one folding arm of the prototype of FIG. 2 in its fully collapsed operating position. Although more difficult to depict because of the physical proximity of the struts, again as depicted in FIG. 3, each arm has two attachment points on the main body. The first attachment of each arm is a long first strut rotatably attached to a fixed non-moving portion of the main body. The second rotatable attachment of each arm is a shorter second strut that is rotatably connected to the first strut about half way up the first strut and is also rotatably connected to a moveable member of the body. The multiple struts remain connected to each other as described earlier herein. However it may be seen that the fourth strut is effectively the most visible topmost strut in the stack of collapsed struts. Continuing to refer to FIG. 6 it may be seen that the fifth strut and the first strut are barely visible in this view. The operation of the various struts is described in more detail later herein with regard to FIG. 15 and FIG. 16. Note that fifth strut 120f has rotated completely back to a more folded or collapsed position rather than acting as an extension to the fourth strut 102d. In this manner the fifth strut 120f pulls the screen member 110 back over the arms and the body.

Figure 7:
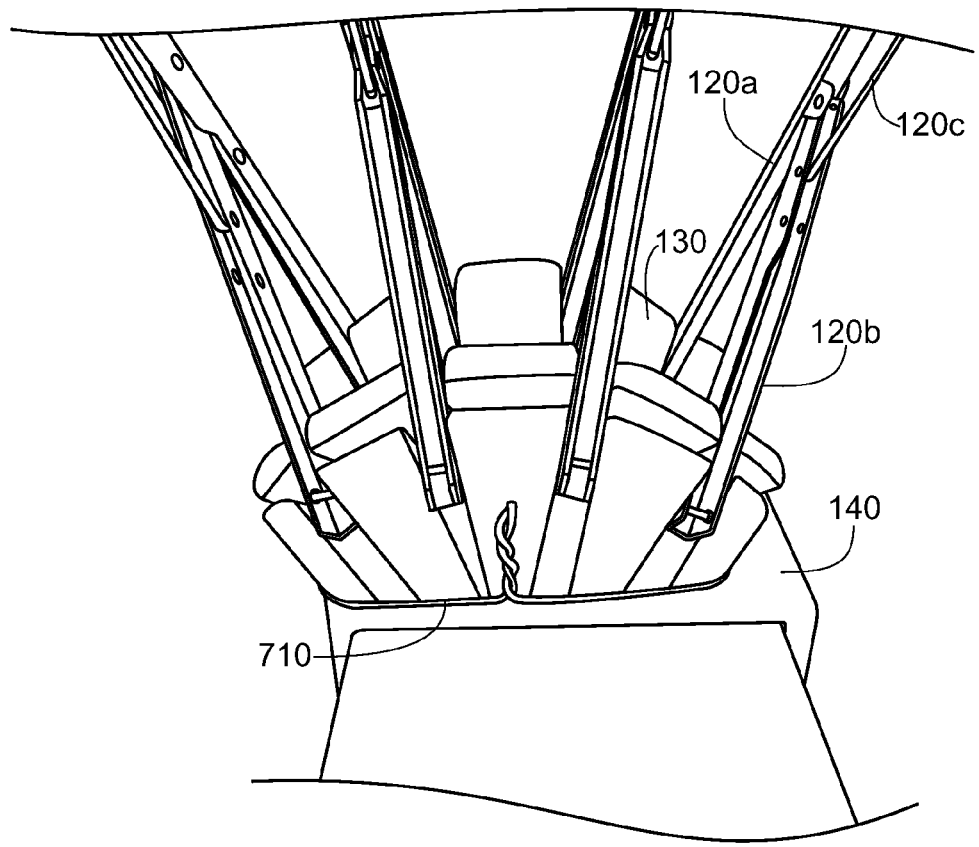
FIG. 7 depicts the attachment of a portion of the folding arms of a prototype to the fixed and moveable portions of a prototype display.

Referring now to FIG. 7, there may be seen the attachment of a portion of the folding arms of a different prototype to the fixed housing 130 and moveable member 140 of a prototype display of the present invention. The embodiment of FIG. 7 employs four arms for each attachment point instead of two arms as depicted for the embodiment of FIG. 2. The two outer arms are connected to the corners of the screen and the two inner arms connected to the left, or right, edge equally spaced between the corners of the screen. The attachment of the second shorter strut 120b to the moveable member 140 the device is depicted in the foreground and the attachment of the first longer strut 120a to the fixed portion of the body 130 is in the background. As may be seen in FIG. 7, each of the two struts are rotatably connected to their respective body portion using openings at the end of each arm that is then held in a slotted opening in the body or moveable member for each arm. Each arm is rotatably held in place by means of a wire member 710 passing through the opening at the end of each strut 120a, 120b and a slotted opening in the body 130 or moveable member 140 for containing the wire member in a recessed manner. The slotted portion of the body for containing the wire member is configured to have edges away from the arms that prevent the wire member 710 from slipping out of the slotted opening once the wire member has passed through all the strut openings and is then connected to itself to form a closed loop and hold the arm struts in a rotatable manner to the body 130 or moveable member 140.

Figure 8:
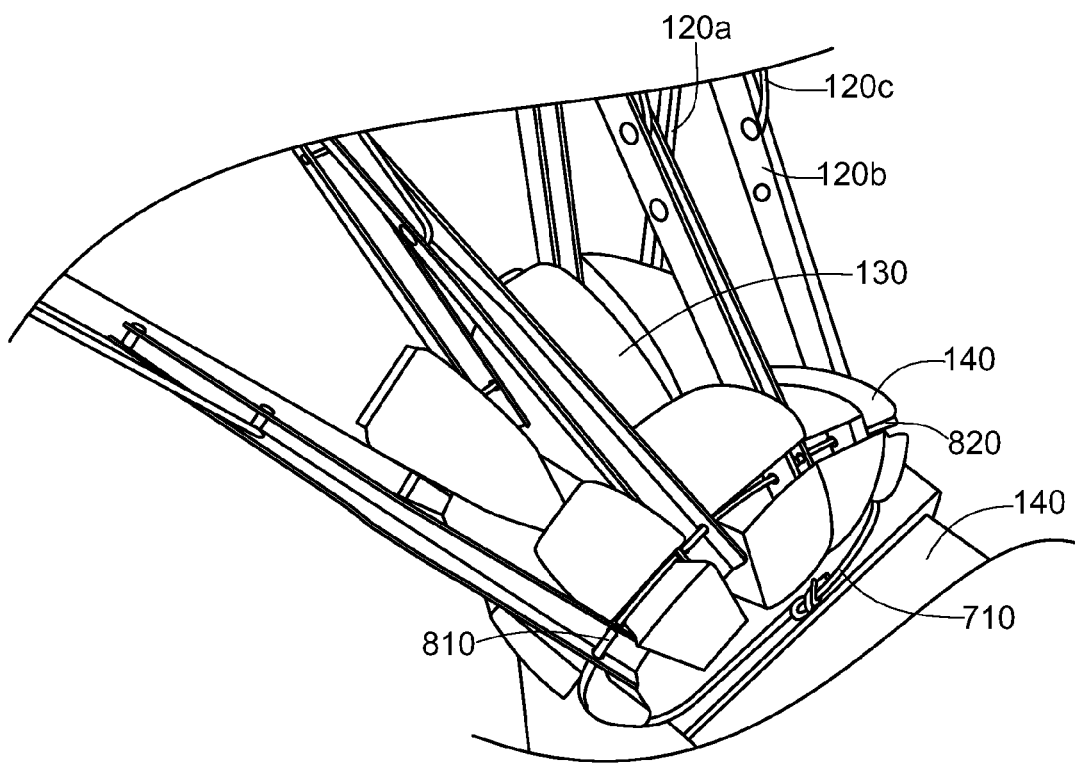
FIG. 8 depicts the attachment of folding arms of the prototype of FIG. 7 from a more elevated direction.

Referring now to FIG. 8, there may be seen the attachment of a portion of the folding arms of the prototype of FIG. 7 to the fixed 130 and moveable 140 portions of a prototype display, but in a more elevated view. The attachment of the second struts 120b to the moveable member 140 of the body 130 is depicted in the foreground and the attachment of the first struts 120a to the fixed portion 130 of the body is in the background. As may be seen, each of the struts are rotatably connected to their respective body portion using openings near the end of each arm that is then held in a slotted opening 810 in the body for each arm. Each arm is rotatably held in place by means of a wire member 710 passing through the opening near the end of each strut 120a, 120b, and a slotted opening 820 in the body for containing the wire member in a recessed manner. The slotted portion of the body 820 for containing the wire member is configured to have edges away from the arms that prevent the wire member from slipping out of the slotted opening once the wire member has passed through all the strut openings and is then connected to itself to form a closed loop and hold the arms in a rotatable manner to the body.

Continuing to refer to FIG. 8, it may be clearly seen that struts 120a and 120b are u-shaped and sized to allow for other strut members to nest inside the u-shape when fully collapsed. And that the third strut 120c is a circular wire member that can retract into the "u" portion of the first and second struts when the struts are in the collapsed operating position. In a similar manner, the fourth strut 120d is u-shaped and the fifth strut is a circular wire member for retracting into the "u" portion of the fourth strut 120*d*. The struts can also be non-u-shaped while still performing the same function.

Figure 9:
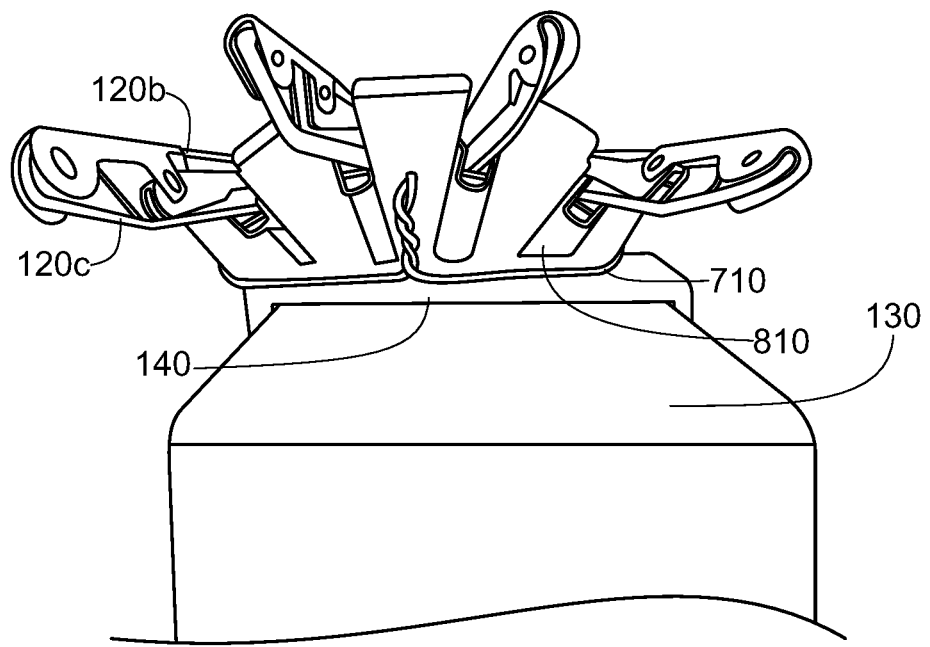
FIG. 9 depicts the attachment of folding arms of the prototype of FIG. 7 in a fully collapsed position from a different direction.

Referring now to FIG. 9, there may be seen the attachment of a portion of the folding arms of the prototype of FIG. 7 to the fixed 130 and moveable 140 portions of a prototype display, but in the collapsed position. The attachment of the second struts 120*b* to the moveable member 140 of the body 130 is depicted in the foreground. Each arm is rotatably held in place by means of a wire member 710 passing through each arm opening and a slotted opening in the body for containing the wire member in a recessed manner. The slotted portion of the body 810 for containing each arm is also depicted. The wire member 710 is configured to have edges away from the arms that prevent the wire member from slipping out of the slotted opening once the wire member has passed through all the strut openings and is then connected to itself to form a closed loop and hold the arm struts in a rotatable manner to the body.

Figure 10:
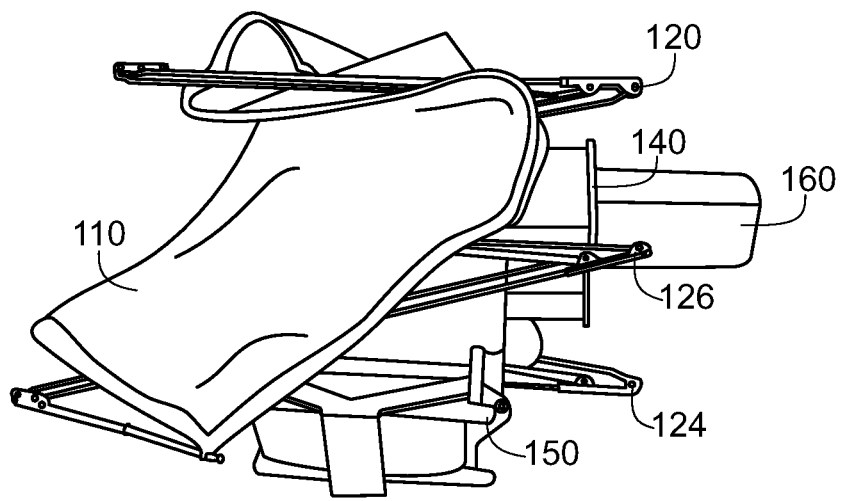
FIG. 10 depicts the prototype of FIG. 2 in a partially collapsed operating position with the screen partially covering one end of the prototype.

Referring now to FIG. 10, there may be seen the prototype of FIG. 2 in its partially collapsed position with the screen partially covering one end of the prototype. More particularly, it may be seen that this embodiment has a partially folded display screen 110 partially covering the four collapsible arms 120, 122, 124, 126 that are each attached at respective corners of the screen. Again each of the arms are also attached to a corresponding location on a body portion, as described earlier herein.

Figure 11:
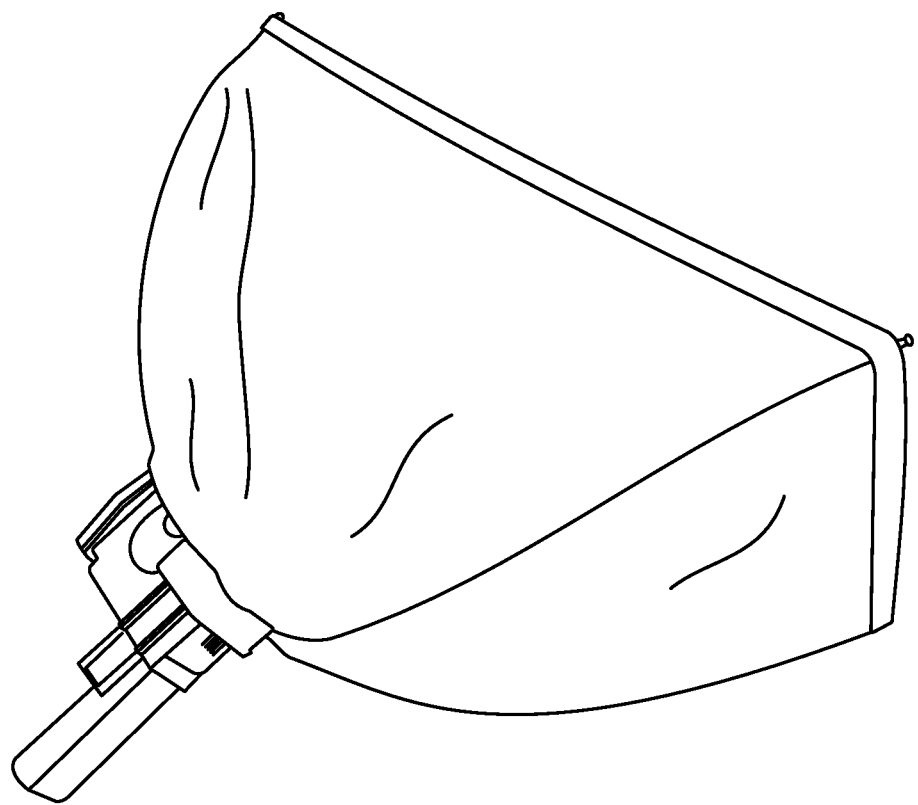
FIG. 11 depicts a prototype of one embodiment of the collapsible display of the present invention in the fully extended operating position with a shroud.

Referring now to FIG. 11, there may be seen the prototype of FIG. 2 in its fully extended operating position and utilizing a shroud. For the embodiment of FIG. 2, a preferred member of the SPUD device for a rear projection type device is a shroud. The shroud encloses the folding arms, the projector and its lens, and the whole trapezoidal cone volume encompassed by the four folding arms on the corners. An embodiment using a shroud requires the device to be a rear projection type device because the back is covered and blocked by the shroud. The shroud is made of vinyl fabric or other cloth material, and it is preferably of some dark color to absorb ambient light. It also blocks external light to improve the contrast of the image, stops dust from getting inside the optical system, and prevents other people from seeing the screen from the back side. Portions of the shroud may also be attached to the arms to assist in collapsing the shroud. For one prototype simple clamps were utilized to attach the shroud to the arms.

Figure 12:
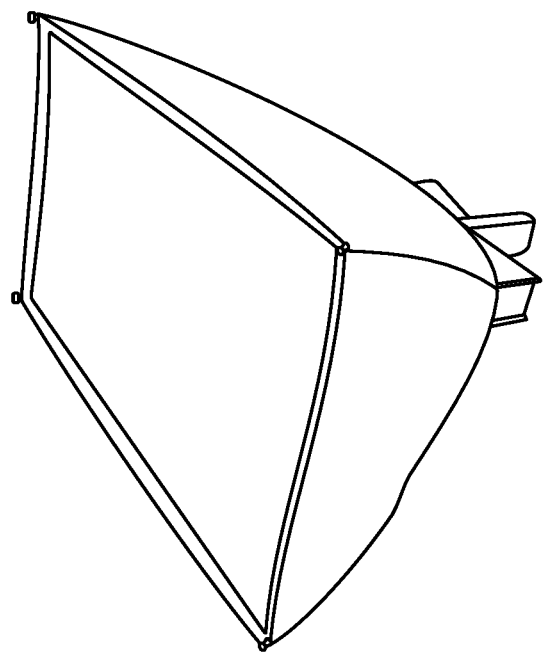
FIG. 12 depicts the prototype of FIG. 11 viewed from a different direction.

Referring now to FIG. 12, there may be seen a different view of the prototype of FIG. 2 in its fully extended operating position and utilizing a shroud. For the embodiment of FIG. 2, a preferred additional member of the SPUD device for a rear projection type device is a shroud. The shroud encloses the folding arms, the projector and its lens, and the whole trapezoidal cone volume encompassed by the four folding arms on the corners. The embodiment using a shroud requires the device to be rear projection because the back is covered and blocked by the shroud. The shroud also covers the screen when in the collapsed operating position.

Figure 13:
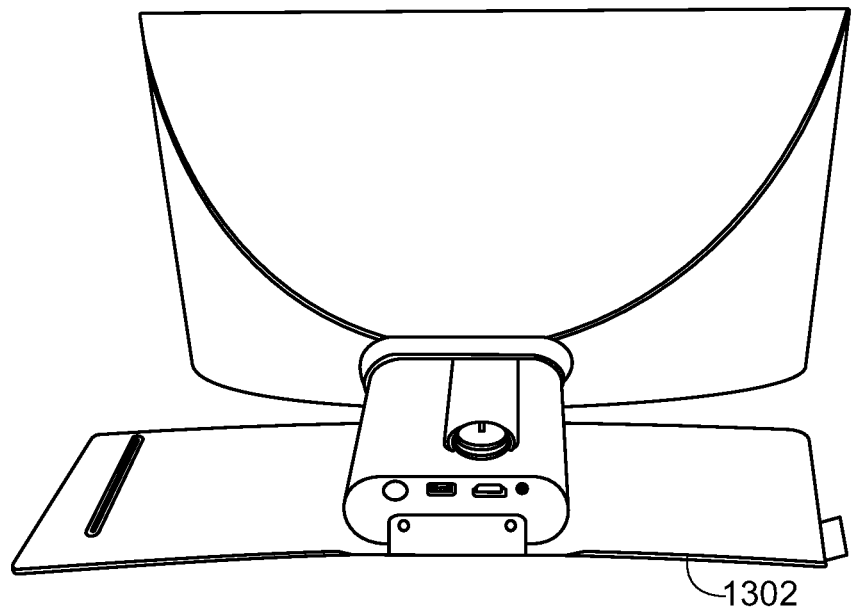
FIG. 13 depicts a protective cover serving as a base for a prototype similar to the prototype of FIG. 2 in its fully extended operating position.

Referring now to FIG. 13, there may be seen a different embodiment in its fully extended operating position, utilizing a shroud, and having a protective cover 1302. The cover 1302 may be used to form a positioning base for this embodiment when in its fully extended operating position.

Figure 14:
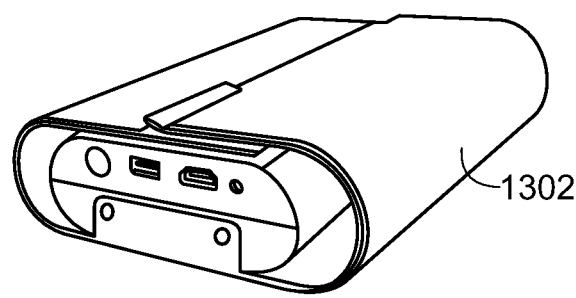
FIG. 14 depicts the protective cover encapsulating the prototype of FIG. 13 in its fully collapsed operating position.

Referring now to FIG. 14, the embodiment of FIG. 13 in its fully collapsed operating position, and having protective cover 1302. The protective cover 1302 encloses the device and its folding arms, the projector and its lens, and the screen when the device is in its fully collapsed operating position. For this embodiment the protective cover may use Velcro type patches for keeping the protective cover closed around the device.

Figure 15:
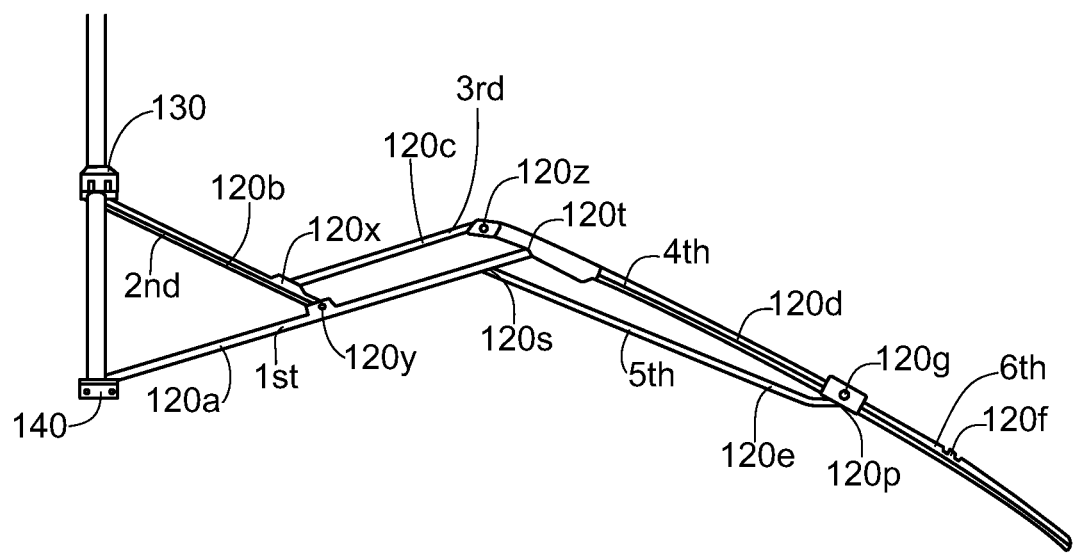
FIG. 15 depicts the details of one folding arms of the prototype of FIG. 2 in its fully extended operating position.
Figure 16:
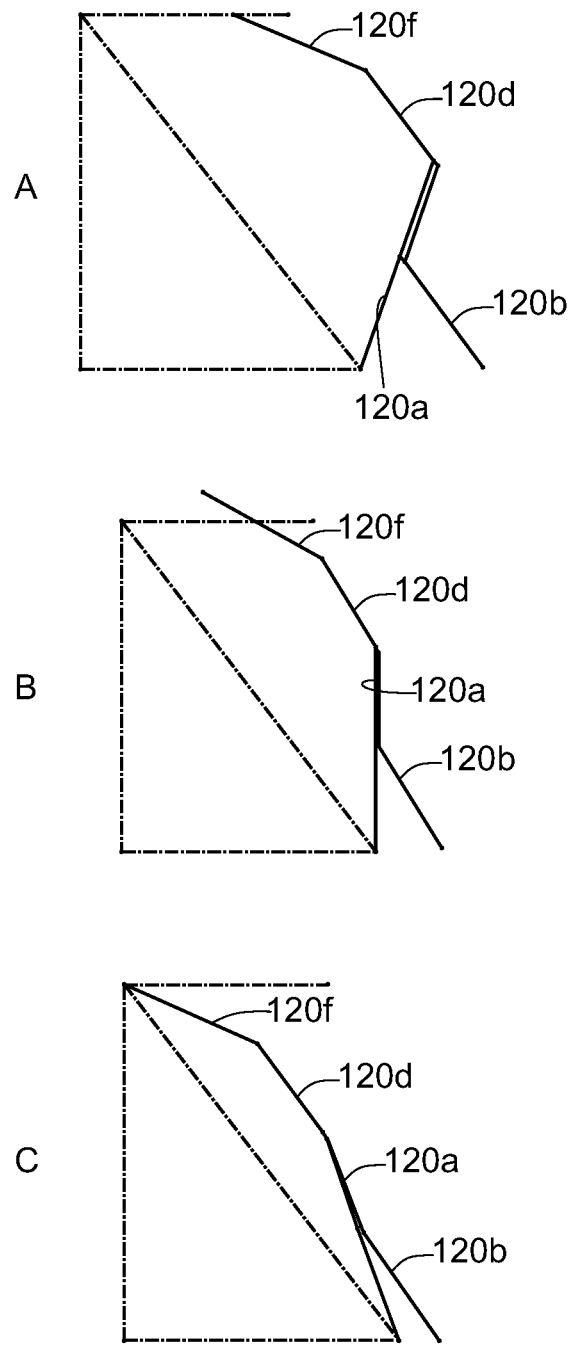
FIGS. 16A, 16B and 16C depict the simplified operation of one of the folding arms of the prototype of FIG. 2 in its partially extended, mostly extended and fully extended operating positions, respectively.

Referring now to FIG. 15, there may be seen an expanded view of one of the folding arms 120, 122, 124, 126, of the prototype of FIG. 2 in its fully extended operating position. Again, the arm has two attachment points on the main body. The first attachment is a long first strut 120*a* rotatably attached to a fixed non-moving portion of the main body 130 housing, as described earlier herein for FIGS. 7-9. The second rotatable attachment is a shorter second strut 120*b* that is rotatably connected 120*y* to the first strut 120*a* about half way up the first strut and is also rotatably connected, as described earlier herein for FIGS. 7-9, to a moveable member 140 of the body that is partially disposed on or around the housing 130. Note also that the shorter second strut 120*b* has a third strut 120*c* rotatably connected 120*x* to it and also to a fourth strut 120*d* that is rotatably connected 120*t* to the first strut 120*a* at nearly one end and rotatably connected 120*z* to the third strut 120*c* at that same end. Continuing to refer to FIG. 15 it may be seen that each arm also has a fifth strut 120*e* rotatably connected 120*s* to the first strut 120*a* approximately adjacent the rotatable connection 120*z* of the third and fourth struts and is also rotatably connected 120*q* at the opposite end of the fifth strut 120*e*. The fourth strut 120*d* is separately rotatably connected 120*q* to a sixth strut 120*f* at the end not connected to the third strut. The sixth strut 120*f* in turn is connected at the other end to the screen 110 (not depicted) on one corner of the screen. For some embodiments of the present invention, each of these arms is preferably an actual umbrella arm like the ones commercially available in umbrellas made by Paradise Umbrella that have been modified for use in the present invention. These arms are modified by shortening the arm strut that will be attached to the moveable member of the device. The arm strut is shortened to deploy the arms in a direction forward of the main body and roughly parallel to the main body axis rather than to the side of the main body and perpendicular to the main body axis.

Continuing to refer to FIG. 15, the length of the struts 120*a*, 120*d* and 120*f* determine the distance from the screen to any projector employed in the body when fully extended and also determine the size (length) of the body when in a collapsed operating position. Alternatively, the length of the body may determine the length of the arm struts and the size of the screen may determine the number of segments needed. For example, four segmented struts may be employed to provide more distance to the screen and/or for a larger screen.

Referring now to FIGS. 16A, 16B, and 16C, the operation of the arm will be briefly described. The struts depicted are the first strut 120*a*, the second strut 120*b*, the fourth strut 120*d*, and the sixth strut 120*f* in an x-y plot. FIG. 16A illustrates the relative positions of these struts in an intermediary position on the way to being fully extended. FIG. 16B illustrates the relative positions of these struts in an intermediary position on the way to being fully extended, but is more extended than in FIG. 16A. FIG. 16C illustrates the relative positions of these struts in a fully extended position. From FIG. 16B it may be seen that the tip of strut 120*f* connected to the screen moves farther away from the x axis than in FIGS. 16A and 16C. The tension of the screen holds the arms in the position depicted in FIG. 16C because the screen is more tensioned when the arms are being extended and pass through the position depicted in FIG. 16B. Note that from the movement of the first and second struts that if they get too close together they will cause the screen to collapse in the extended position.

Although the embodiments depicted and described herein above use three segments for each arm, the arms may employ more or less numbers of segments. If a lager screen size is needed then four segments may be employed, or a telescoping portion may be included in the sixth strut 120f connected to the screen to enable that strut to be extended when desired and collapsed into the arm when collapsed. If a smaller screen size is needed then two segments may be employed. The number of segments may be selected depending upon the desired screen size and the desired size of the main body portion. Alternatively, the length of the body may determine the length of the arm struts and the size of the screen may determine the number of segments needed.

Embodiments Using Mirrors

Figure 17:
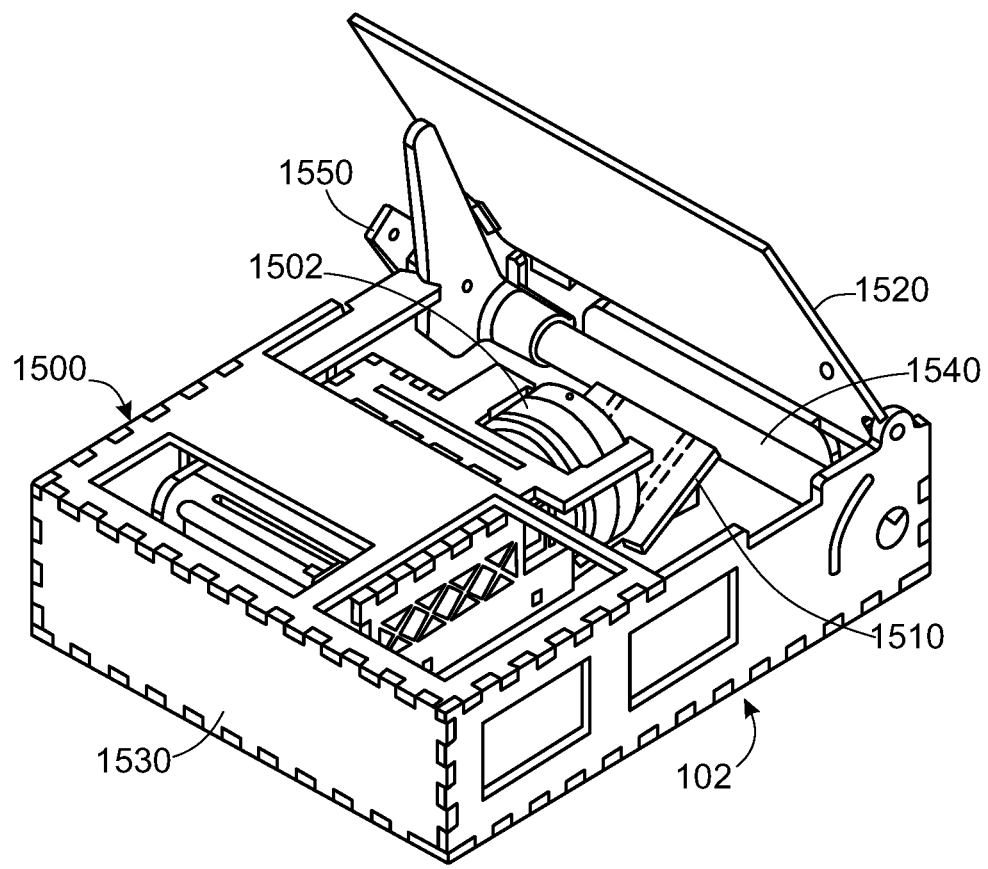
FIG. 17 depicts the main body member of a prototype of the present invention using two mirrors.

Referring now to FIG. 17, a portion of an embodiment using mirrors is depicted. This first mirror embodiment 102 includes a projector of any kind (not depicted), a wide angle converter lens 1502, two mirrors 1510, 1520, a screen (not depicted), slide rails or telescopic arms (not depicted), and a projector housing 1500 that connects with the other device components. The projector, the wide angle converter lens, and the material of the screen are the same as discussed herein above for the earlier described embodiments.

Four slide rails, with stops and latches, are connected to the four corners of the rectangular screen, and provide four forces radially outward along the diagonal from the center of the screen to provide tension in the screen. The other ends of the four slide rails are connected to the housing of the projector. This embodiment uses slide rails to serve both as the tensioning mechanism, and as the arms connecting the screen to the housing. The two arms that connect to the bottom two corners of the screen are fixed on the front panel 1530 of the housing 1500, and they extend horizontally toward the left and right sides to span the width of the screen. The top two arms are connected to a rotating rod 1540 toward the end of the housing 1500. Through a hinge 1550 between each arm and the rod 1540, each of two arms can be opened up to span the width of the screen, and the rod would rotate the slide rail arms upward to span the height of the screen. The slide rails can be retracted when the device is not in use to store the screen and save space.

The two mirrors 1510, 1520 serve as beam deflectors to redirect the light coming out of the projector. The two-mirror system is designed to solve the problem of too much projection throw. One challenge of a SPUD device is to shorten the throw ratio so that SPUD occupies less table space when in use. The wide angle converter lens solves part of the problem, and the two-mirror system further solves the problem. In the previous embodiment, the depth of the device includes the throw depth, and the depth of the projection system (projector and the lens). In this embodiment, the depth of the projection system is beneath, or overlapping with, the throw depth. The beam first comes out from the projector backward away from the screen and goes through the lens. Then the beam reaches the first mirror 1510 and reflects upward. After that, the beam reaches the second mirror, which needs to be much larger as the beam has already expanded. The second mirror 1520 reflects the light forward and finally projects on the screen. The two-mirror system effectively uses the vertical distance between the two mirrors and overlaps the projection system depth with the throw depth to reduce total device depth. The first smaller mirror 1510 is fixed inside the housing, while the second mirror 1520 rotates upward when the slide rails rotate upward, or when the device opens up. The second mirror 1520 may be made of a flexible material like reflective Mylar and retracts when the screen folds up The housing, as previously discussed, connects the slide rails, projection system, and the mirror together. It also serves as a container to hold the screen when not being used. In this two mirror embodiment the screen is deployed horizontally and perpendicular to the horizontal main body axis.

Figure 18:
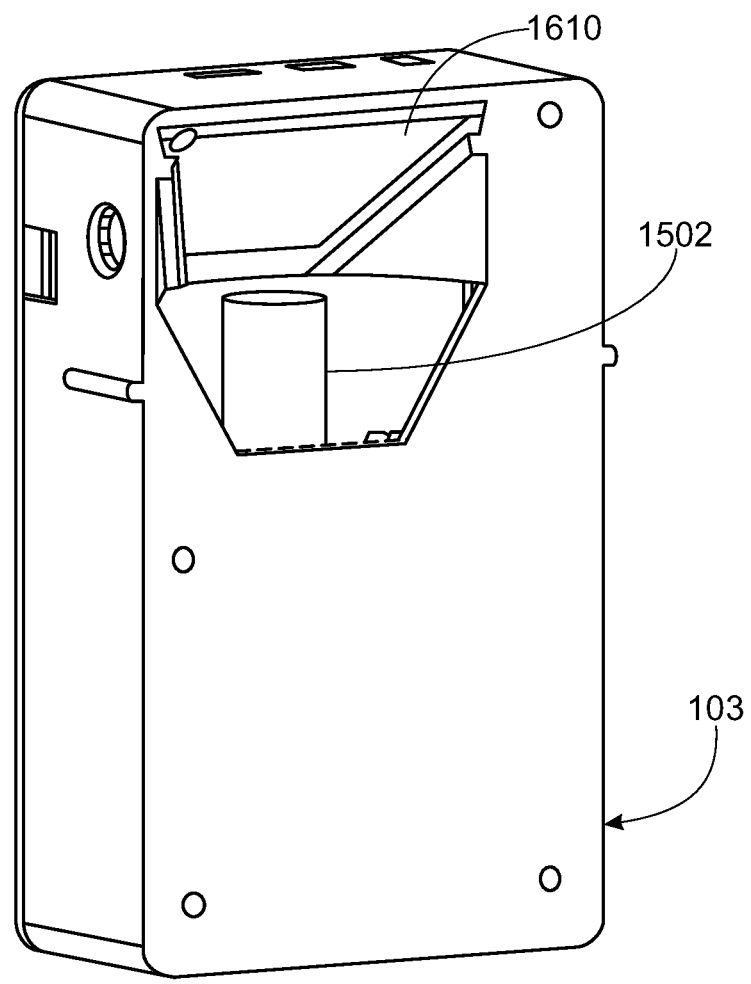
FIG. 18 depicts the main body member of a prototype of the present invention using one mirror.

Referring now to FIG. 18, a portion of an embodiment using a single mirror is depicted. The vertical one-mirror embodiment 103 is a combination of the double-mirror embodiment and a collapsible arm embodiment. It works like the collapsible arm embodiment where a moveable member (sliding block) and multiple folding arms are used to tension the screen. The main body axis is vertical. However, the moveable member moves upward and downward instead of forward and backward. The projector 1502 also projects upward rather than forward. A mirror 1610 then redirects the beams to project forward. This embodiment includes a projector, a wide angle converter lens, a screen, a mirror, a vertical housing, multiple folding arms, a sliding block with rotary folding arm holders, and a shroud. The projector, the wide angle converter lens, the material of the screen, the tension of the screen, the folding arms, and the shroud are the same as in described in the prototype embodiment of FIG. 2.

The depth of the device includes the throw of the projector and the depth of the projection system on the back. The vertical design aims to reduce the depth of the projection system by occupying more vertical space and less horizontal space. However, the sliding member still needs to push the folding arms forward to support the screen. This embodiment uses a rotary folding arm holder (not depicted). When the folding arm is in a fully extended state, the alignment of the arm holders (moveable and fixed) are like that in the prototype embodiment of FIG. 2. When the folding arms are collapsed down, they are folded into a vertical state rather than simply move backwards. Such action requires the front and back folding arm holders to face each other all the time, and therefore needs a rotary mechanism for the holders on both the sliding member and the fixed portion of the housing. The folding arm holders may be designed to hold a plurality of arms but one embodiment used a total of 8 folding arms in the device, as compared to only four arms in the prototype embodiment of FIG. 2. More folding arms can be used to provide more even tension on the screen.

To utilize more vertical space, the projection system is also oriented to project upwards. Because the viewing screen in at the side of the main body, a reflecting mirror 1610 redirects the light. Depending on the angle of the screen desired and the angle of the projection system, the angle of the mirror does not need to be 45 degrees. The mirror used in the system is a first surface mirror to prevent any double reflection or weakening of the projection beam. For this embodiment the screen is deployed vertically and is parallel to the vertical main body axis.

The housing is largely the same as in the prototype embodiment, except it contains rotary folding arm holders and supports a vertical projection system. Another different embodiment is when the housing itself becomes a customized projector, with the lens, projection module, and electronics inside.

Other Embodiments

Besides the embodiments of SPUD described hereinbefore, other embodiments are noted as herein below. One embodiment includes having the screen positioned above another screen, or for example, but limited to, a computer (or laptop) screen ("hovering screen") and another embodiment locates the screen to the side of another screen, or for example, but not limited to, a computer (or laptop) screen ("sideways screen").

Figure 19:
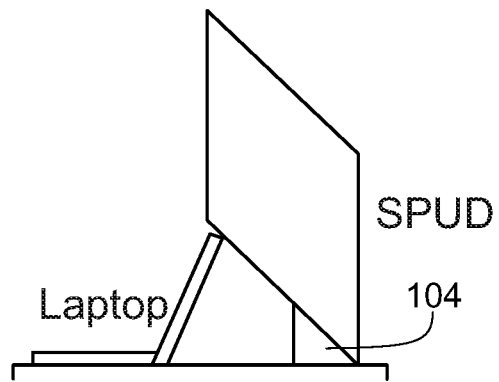
FIG. 19 depicts the arrangement of the body member for a prototype of the present invention for providing a second display screen with a first display screen.

Referring now to FIG. 19, the hovering screen embodiment is similar to prototype embodiment where the main components are a projector, a wide angle converter lens, a screen, a vertical housing, multiple folding arms, a sliding block with rotary folding arm holders, and a shroud. The main difference is that the hovering screen embodiment has its screen around ten inches above the tabletop while the housing sits on the table. The slanted projection system projects light forward and upward to reach the screen. Compared to the prototype of FIG. 2, the hovering screen embodiment further utilizes vertical space by increasing the vertical component of the light path, which allows the embodiment to decrease the depth of the device even more. The empty space beneath the screen of the embodiment will be used to hold a laptop or any other type of screen. If a laptop is placed at the bottom and SPUD is used as a secondary display, the workstation setup would be one display at the bottom and the SPUD being the other at the top. For this embodiment the screen is deployed vertically and at a height above and offset from the horizontal axis of the main body.

Figure 20:
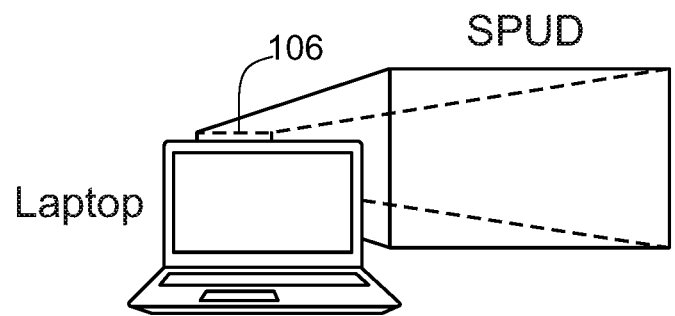
FIG. 20 depicts a different arrangement of the body member for a prototype of the present invention for providing a second display screen with a first display screen.

Referring now to FIG. 20, similar to the hovering screen embodiment, the sideway screen embodiment also uses projection directions other than the forward direction to reduce device depth. If one defines the ordinary forward direction used in the prototype embodiment in FIG. 2 as x direction (also the depth direction), and the vertical direction used in the hovering screen embodiment, then the sideway screen embodiment uses the y direction. The sideway screen embodiment is similar to hovering screen embodiment where the main components are a projector, a wide angle converter lens, a screen, a vertical housing, multiple folding arms, a sliding block with rotary folding arm holders, and a shroud. The main difference is that instead of offsetting the screen upwards, the sideway screen embodiment shifts the screen sideways. For this embodiment the screen is deployed vertically and is offset from the horizontal axis of the main body.

While the present invention has been described with respect to the embodiments set forth above, the present invention is not necessarily limited to these embodiments. Accordingly, other embodiments, variations, and improvements not described herein are not excluded from the scope of the present invention. Such variations include but are not limited to new screen material, different kinds of projection devices not discussed, or new folding arm concepts.

Although the present invention and its advantages have been described in detail, it should be understood that various changes, substitutions and alterations can be made herein without departing from the spirit and scope of the invention as defined by the appended claims.

What is claimed is:

1. An improved collapsible display device, comprising:
 a housing member having a moveable member on the exterior of said housing and said moveable member is slideably moveable between two positions on said exterior of said housing,
 a collapsible screen capable of displaying an image when in an extended operating position, and
 multiple extendible members connected to said screen and rotatably connected to both said moveable member and said housing, and said moveable member in cooperation with said extendible members moves said screen between the collapsed and extended operating positions as said moveable member moves between a first position and a second position on said exterior of said housing.

2. The device of claim 1, further comprising:
 one or more frame members embedded in the edges of said screen for maintaining said screen in an extended position.

3. The device of claim 1, wherein each of said extendible members comprise,
 multiple struts interconnected for collapsing and extending said screen as a function of said position of said moveable member on said exterior of said housing.

4. The device of claim 1, wherein each of said extendible members comprise,
 four main struts interconnected to allow for collapsing and extending said screen responsive to said position of said moveable member on said exterior of said housing.

5. The device of claim 1, wherein each of said extendible members comprise,
 four main struts and at least three minor struts interconnected to said main struts to allow for collapsing and extending said screen responsive to said position of said moveable member on said exterior of said housing.

6. The device of claim 5, wherein each of said extendible members comprise,
 a strut interconnected with said screen that is telescoping for extending said screen farther from said housing member.

7. The device of claim 1, further comprising:
 a shroud that connects to said screen and said housing for blocking external light from the screen when said screen is in the extended operating position.

8. The device of claim 1, wherein:
 said screen collapses around said housing in its collapsed operating position.

9. The device of claim 1, wherein said collapsible screen is removable.

10. The device of claim 1, wherein said collapsible screen is a flexible OLED, LED, LCD, or any other type of electronically controlled flexible display.

11. The device of claim 1, further comprising:
 said housing has an opening for containing a projector.

12. A collapsible display device, comprising:
 a housing member,
 a moveable member slidably disposed on the exterior of said housing and moveable between two positions on said housing member,
 a translucent screen member,
 at least four segmented arm members each having at least two main struts members for moving said screen between a collapsed position and an extended operating position,
 each first main strut of each of said four arm members rotatably connected to said housing,
 minor struts rotatably connected to a corresponding first strut and rotatably connected to said moveable member,
 each of said arm members having a final main strut member connected to said screen, and
 a shroud member connected to said housing and said screen.

13. The device of claim 1, further comprising,
 a protective member for containing all the members of said device when said device is in a collapsed operating position.

14. A collapsible, portable display device, comprising:
a housing member,
a moveable member disposed on the exterior of said housing and moveable between two self-locking positions on said exterior of said housing member,
a screen member,
segmented arm members responsive to said moveable member for moving said screen between a collapsed and extended operating position, with each arm member having a first strut rotatably attached to said main body housing, a second strut rotatably connected to the first strut about half way up the first strut and rotatably connected to said moveable member, a third strut rotatably connected to said second strut, a fourth strut rotatably connected to said first strut at nearly one end and rotatably connected to said third strut at that same end, a fifth strut rotatably connected to said first strut approximately adjacent the rotatable connection of said third and fourth struts and rotatably connected at the opposite end of the fifth strut, and said fourth strut is separately rotatably connected to a sixth strut at the end not connected to the third strut, and said sixth strut is connected at the other end to one corner of the screen, and
a shroud member connected to said housing and said screen.

15. The device of claim 14, further comprising,
a protective member for containing all the members of said device when said device is in a collapsed operating position.

16. The device of claim 14, wherein said housing member has an opening for containing a projector member with an attached wide angle converter lens.

17. The device of claim 1, wherein said moveable member is spring loaded to operate to deploy the screen to a fully extended operating position when released by a latching mechanism.

18. The device of claim 1, wherein said screen member is configured to be a touch screen.

19. The device of claim 14, wherein said housing member contains at least one mirror for increasing the optical path length between a projector in said housing member and said screen.

20. The device of claim 1, wherein said housing member contains at least one mirror for increasing the optical path length between a projector and said screen.

* * * * *